(12) United States Patent
Smith et al.

(10) Patent No.: US 10,245,804 B2
(45) Date of Patent: Apr. 2, 2019

(54) FIRE RETARDED ARAMID FIBER-BASED HONEYCOMB

(71) Applicant: Hexcel Corporation, Dublin, CA (US)

(72) Inventors: Lance Smith, Pleasanton, CA (US); Yen-Seine Wang, San Ramon, CA (US)

(73) Assignee: HEXCEL CORPORATION, Dublin, CA (US)

( * ) Notice: Subject to any disclaimer, the term of this patent is extended or adjusted under 35 U.S.C. 154(b) by 537 days.

(21) Appl. No.: 14/885,896

(22) Filed: Oct. 16, 2015

(65) Prior Publication Data

US 2017/0106620 A1    Apr. 20, 2017

(51) Int. Cl.
*B32B 3/12* (2006.01)
*D21H 21/34* (2006.01)
(Continued)

(52) U.S. Cl.
CPC .................. *B32B 3/12* (2013.01); *B32B 5/20* (2013.01); *D21H 5/0002* (2013.01); *D21H 13/26* (2013.01); *D21H 19/24* (2013.01); *D21H 23/22* (2013.01); *B32B 2250/02* (2013.01); *B32B 2255/02* (2013.01); *B32B 2255/26* (2013.01); *B32B 2262/0269* (2013.01); *B32B 2307/3065* (2013.01); *B32B 2605/18* (2013.01)

(58) Field of Classification Search
CPC ......... B32B 3/12; B32B 5/20; B32B 2250/02; B32B 2255/02; B32B 2255/26; B32B 2262/0269; B32B 2307/3065; B32B 2605/18; D21H 13/26; D21H 5/0002; D21H 19/24; D21H 23/22
See application file for complete search history.

(56) References Cited

U.S. PATENT DOCUMENTS 4,331,614 A    5/1982   Schmidt et al.
4,557,961 A   12/1985   Gorges
(Continued)

FOREIGN PATENT DOCUMENTS

EP    303173 A  *  2/1989
EP   1149691 B1    2/2004
(Continued)

OTHER PUBLICATIONS

Machine translation of JP 62223398. (Year: 1987).*
(Continued)

*Primary Examiner* — John D Freeman
(74) *Attorney, Agent, or Firm* — W. Mark Bielawski; David J. Oldenkamp

(57) ABSTRACT

An alternate resin-coated paper material for use in making honeycomb. The alternate resin-coated paper material is made from a paper that contains from 30 to 50 weight percent aramid fibers and from 50 to 70 weight percent of non-aramid fibers. A fire retarded phenolic resin is incorporated into the paper to make it self-extinguishing in less than 10 seconds with a self-extinguishing burn length of less than 12 inches when exposed to a 12-second vertical flame in accordance with the vertical burn test requirements set forth in 14 C.F.R. Part 25.583. The fire retarded phenolic resin includes a phenol formaldehyde resin and a phosphorous-containing fire retardant.

8 Claims, 2 Drawing Sheets

(51) Int. Cl.
*D21H 13/26* (2006.01)
*D21H 19/24* (2006.01)
*D21H 23/22* (2006.01)
*B32B 5/20* (2006.01)

(56) References Cited

U.S. PATENT DOCUMENTS

| | | | |
|---|---|---|---|
| 4,729,921 A | | 3/1988 | Tokarsky |
| 4,880,681 A | * | 11/1989 | Price ............... C08J 5/04 244/117 A |
| 5,026,456 A | | 6/1991 | Hesler et al. |
| 5,789,059 A | | 8/1998 | Nomoto |
| 6,544,622 B1 | | 4/2003 | Nomoto |
| 6,673,415 B1 | * | 1/2004 | Yamazaki ............ B32B 3/12 428/117 |
| 6,820,681 B2 | * | 11/2004 | Ohgami ............ F24F 3/1423 165/10 |
| 7,815,993 B2 | | 10/2010 | Hendren et al. |
| 8,764,941 B2 | | 7/2014 | Heng et al. |
| 8,975,367 B2 | | 3/2015 | Freitag et al. |
| 2006/0189236 A1 | | 8/2006 | Davis et al. |
| 2008/0051495 A1 | * | 2/2008 | Murakami ........... C08K 5/5399 524/100 |
| 2009/0043013 A1 | | 2/2009 | Stahl et al. |
| 2009/0214818 A1 | | 5/2009 | Levit et al. |
| 2011/0281063 A1 | | 11/2011 | Levit et al. |

FOREIGN PATENT DOCUMENTS

| | | |
|---|---|---|
| EP | 17563608 B1 | 2/2007 |
| JP | 62223398 A * | 10/1987 |
| WO | 2007/050536 A1 | 10/2006 |
| WO | 2009012286 | 1/2009 |

OTHER PUBLICATIONS

Brochure—FRX Polymers—"The clear choice for environmentally-friendly, flame retardant plastics", 2012, pp. 1-4.
Data Sheet—NOFIA—"Performance Properties OL1001 and OL3001", Sep. 2012, p. 1-2.

* cited by examiner

FIRE RETARDED ARAMID FIBER-BASED HONEYCOMB

BACKGROUND OF THE INVENTION

1. Field of the Invention

The present invention relates generally to honeycomb made from aramid fiber paper that is coated with a phenolic resin. More particularly, the present invention is directed to providing alternative aramid fiber-based papers that have reduced aramid fiber content, but which can be coated with phenolic resin to produce an alternative honeycomb material that exhibits structural and thermal properties that are on the same level as conventional honeycomb material made using well known aramid paper.

2. Description of Related Art

A popular type of aircraft structural panel is made up of face sheets (also referred to as "skins") that are adhesively bonded to opposite sides of a light weight core material These types of sandwich panels are desirable in aircraft because they are light weight and very strong. Honeycomb is widely used as a core material in aircraft structural panels because of its high strength to weight ratio and resistance to fatigue failures.

For example, honeycomb structural panels have been used as floor panels in the fuselages of aircraft. Floor panels are used, especially in large commercial aircraft, to separate the passenger compartment from the various electrical, hydraulic and structural components located in the bottom of the fuselage. The floor panels are generally classified depending on their location and intended use. For example, large commercial aircraft typically include four different types of floor panels: 1) aisle panels; 2) under seat panels; 3) galley panels; and 4) high load panels. The physical characteristics of the panels vary depending on the particular loads experienced during use. For example, the aisle and under seat floor panels tend to be lighter than and not as strong as galley and high load floor panels.

Honeycomb structural panels, as well as other parts and materials, which are used in aircraft interiors, must exhibit certain minimum levels of resistance to heat and fire. The specific thermal requirements for structures, parts and other materials used in aircraft interiors are set forth in 14 C.F.R. Part 25.853.

One requirement under 14 C.F.R. Part 25.853 is that honeycomb structural panels, when oriented in a vertical position, must be "self-extinguishing" after being subjected to a flame for 12 or 60 seconds in accordance with the test procedures set forth in Appendix F of 14 C.F.R. Part 25.853. Another requirement is that the honeycomb structural panels must have certain heat release properties when tested according to standardized Ohio State University (OSU) heat release tests, as set forth in Appendix F of 37 C.F.R. Part 25.853.

NOMEX® aramid paper is a well-established material that has been widely used for many years to make honeycomb for use in aircraft structural panels. NOMEX® aramid paper is produced by E.I. DuPont de Nemours & Company (Wilmington, Del.). Honeycomb cores made from NOMEX® aramid paper that has been coated with a phenolic resin have been, and continue to be, very popular because they provide a desirable combination of lightweight, high strength and excellent thermal properties.

NOMEX® paper, by itself, does not have to meet the requirements of 14 C.F.R. Part 25.853 because the requirements under this regulation are directed to the structural panel, as a whole, as opposed to the individual components that make up the panel. Even so, the individual thermal properties of the face sheets, the honeycomb, and the paper that are used to make the honeycomb structural panels, are still important and must be taken into consideration when making a structural panel for use in the interior of an aircraft. It is desirable that the individual thermal properties of these components be sufficient so that they can be combined to form a structural panel where the panel, as a minimum, will meet the requirements of 14 C.F.R. Part 25.853.

The testing procedures set forth in 14 C.F.R. Part 25.853 may be used to evaluate the thermal properties of the paper and the honeycomb made from the paper in order to provide an indication of the suitability of the paper and honeycomb for use in making a structural panel that meets or exceeds the requirement of 14 C.F.R. Part 25.853. For example, NOMEX® paper, by itself, self-extinguishes in less than 1 second and exhibits a vertical burn length of less than 9 inches (22.9 cm) when subjected to the 12-second vertical burn test set forth in Appendix F. When NOMEX® aramid paper is coated with a phenolic resin, the resulting coated-paper material self-extinguishes in about 2 seconds and exhibits a vertical burn length of about 2 to 3 inches (5 to 7.6 cm).

NOMEX® aramid paper, which has been formed into a honeycomb that is coated with a phenolic resin, exhibits a peak heat release of about 57 $kW/m^2$, a time to peak heat release of about 51 seconds and a 2 minute heat release of about 68 $kW\text{-minute}/m^2$ when tested in accordance with Appendix F of 37 C.F.R. Part 25.853.

The above thermal properties make NOMEX® aramid paper particularly well suited for use in aircraft structural panels that meet or exceed the burn requirements set forth in 14 C.F.R. Part 25.853. However, NOMEX® aramid paper, and aramid papers in general that are composed entirely of aramid fibers, tend to be relatively expensive. Accordingly, there is an incentive to develop alternative papers that can be coated with a phenolic resin to provide an alternate resin-coated paper material and formed into honeycomb that is suitable for making structural panels that can be used in aircraft and other demanding applications where excellent thermal properties, such as those exhibited by NOMEX® aramid paper, are required.

SUMMARY OF THE INVENTION

In accordance with the present invention, it was discovered that alternative aramid fiber-based papers can be made, which have substantially lower amounts of aramid fiber than is present in the industry standard NOMEX® aramid paper and which, when coated with a fire-retarded phenolic resin, exhibit structural and thermal properties that are in many respects similar to phenolic-resin coated NOMEX® aramid paper.

Unlike NOMEX® aramid paper, the alternative aramid fiber-based papers in accordance with the present invention do not exhibit the same low self-extinguishing times and burn lengths when subjected to the 12-second vertical burn test, as set forth in 14 C.F.R. Part 25.853. As a feature of the present invention, it was discovered that an alternate resin-coated paper material, which has self-extinguishing times and burn lengths under 14 C.F.R. Part 25.853 that are similar to resin-coated NOMEX® aramid paper, can be made from the alternative aramid fiber-based paper provided that the alternative paper is coated with a fire retarded phenolic resin.

The present invention is directed to the alternate resin-coated paper material that is formed by coating the alternative aramid fiber-based paper with a fire retarded phenolic resin, as well as, the honeycomb that is formed from the alternate resin-coated paper material. The alternate resin-coated paper material is particularly well suited for use in making honeycomb that is designed for use in aircraft interior structural panels where the structural panels are self-extinguishing when exposed to fire.

The alternate resin-coated paper material in accordance with the present invention includes an alternative aramid fiber-based paper that contains from 30 to 50 weight percent aramid fibers and from 50 to 70 weight percent of non-aramid fibers, based on the total weight of the paper. The layer of alternative aramid fiber-based paper, by itself, has relatively high self-extinguishing times of 60 seconds or more and burn lengths of 12 inches (30.5 cm) or more when subjected to the 12-second vertical burn test, as set forth in 14 C.F.R. Part 25.853. The alternate resin-coated paper material includes a fire retarded phenolic resin made up of a phenol formaldehyde resin and a sufficient amount of a phosphorous-containing fire retardant so that the fire retarded phenolic resin contains from 2 to 6 weight percent phosphorous. It was discovered that the combination of alternative aramid fiber-based paper and fire retarded phenolic resin coating had self-extinguishing times and burn lengths that matched those of NOMEX® aramid paper provided that a sufficient amount of the fire retarded phenolic resin was coated onto the alternative aramid fiber-based paper.

The present invention is also directed to the methods for making the alternate resin-coated paper material and the methods for making honeycomb from the alternate resin-coated paper material. The invention also covers structural panels that include the alternate honeycomb as well as the methods for making structural panels that utilize the alternate honeycomb as the core.

As a feature of the invention, meta-aramid and/or para-aramid fibers may be used to make up the 30 to 50 weight percent of aramid fibers in the alternative aramid-fiber based paper. The 50 to 70 weight percent of non-aramid fibers are made from less expensive fibers that do not have the same thermal properties and stiffness as aramid fibers, but which provide other advantages to the alternative aramid-fiber based paper, such as flexibility, formability and processability.

As a further feature of the invention, the phosphorous-containing fire retardant that is present in the fire retarded phenolic resin is a phenoxyphosphazene or phosphonate oligomer. These particular types of phosphorous-containing fire retardants were found to be especially advantageous when combined with a phenol formaldehyde resin to form a fire retarded resin that can be coated onto the alternative aramid fiber-based paper in an amount sufficient to improve the thermal properties of the resulting alternate resin-coated paper material to match the self-extinguishing properties of NOMEX® aramid paper when tested according to 14 C.F.R. Part 25.853.

The above described and many other features and attendant advantages of the present invention will become better understood by reference to the following detailed description when taken in conjunction with the accompanying drawings.

DETAILED DESCRIPTION OF THE INVENTION

The present invention is intended to provide an alternate resin-coated paper material which can be used as a substitute for resin-coated papers that are presently used to make the honeycomb cores for aircraft structural panels. For example, HRH®10 is a honeycomb made by Hexcel Corporation (Dublin, Calif.) that is composed of NOMEX® aramid paper which has been coated with a phenolic resin. HRH®36 is a honeycomb made by Hexcel Corporation (Dublin, Calif.) that is composed of KEVLAR® aramid paper which has been coated with a phenolic resin. KEVLAR® aramid paper is produced by E.I. DuPont de Nemours & Company (Wilmington, Del.). As is well known, NOMEX® aramid paper is composed of meta-aramid fibers whereas KEVLAR® aramid paper is made from para-aramid fibers. Both HRH®10 honeycomb and HRH®36 honeycomb have been widely used as the core in aircraft structural panels. The alternate resin-coated paper material is intended to be a substitute honeycomb material in any situation, including non-aircraft uses, where either HRH®10 honeycomb and/or HRH®36 honeycomb have been found to be a suitable honeycomb.

Although the main intended use for the alternate resin-coated paper material is as a honeycomb material for aircraft structural panels, the alternate resin-coated paper may be used in any situation where a high strength, light weight and fire resistant honeycomb is required. Such other applications include air directionalization and energy absorption.

Figure 1:
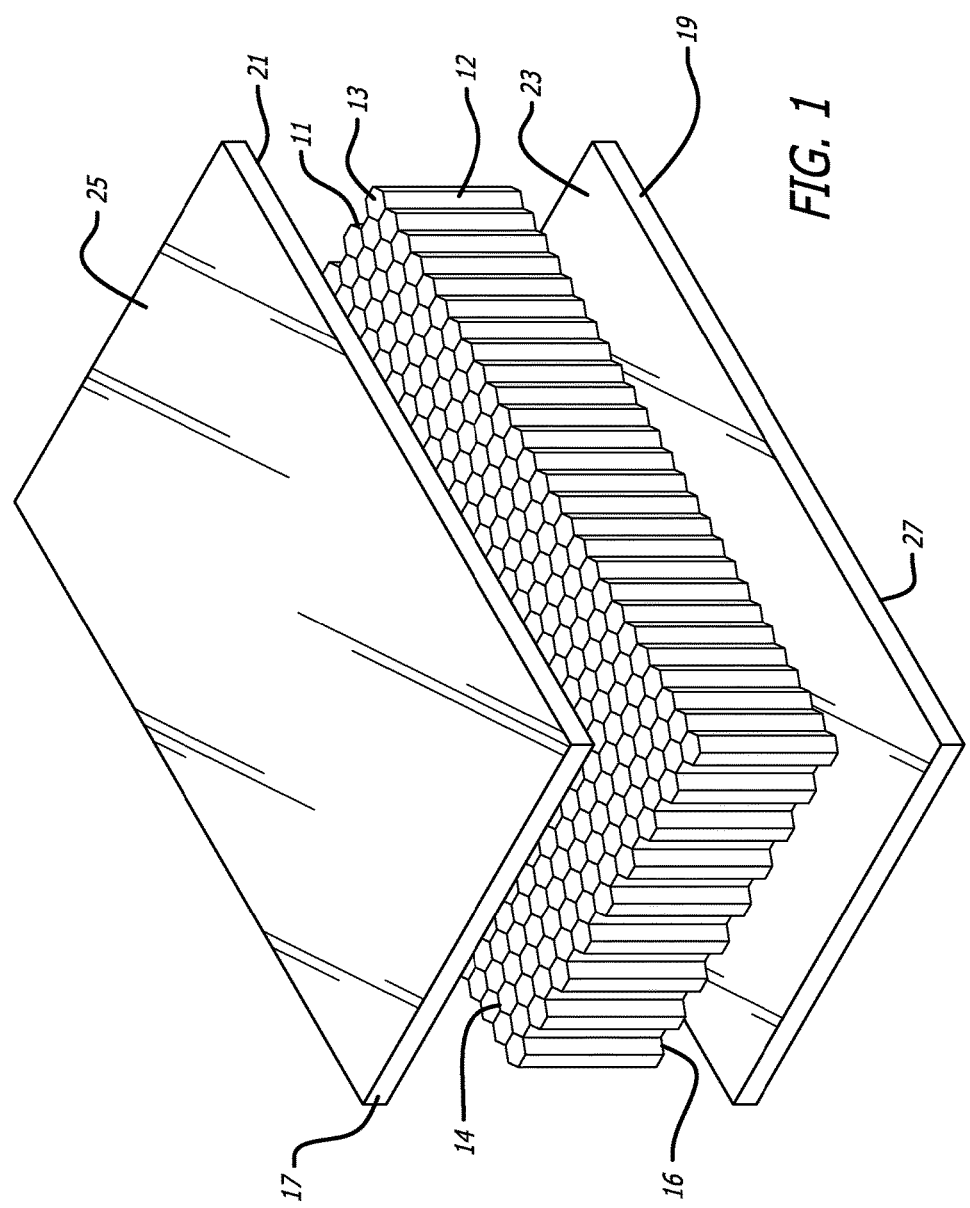
FIG. 1 is a perspective view of a preferred exemplary honeycomb core and two composite face sheets prior to bonding of the honeycomb to the face sheets.

The three basic components of an exemplary honeycomb structural panel for use in aircraft and other aerospace applications are shown in FIG. 1 prior to formation of the panel. The components include a honeycomb core 12 that has walls 11 which form a plurality of honeycomb cells 13. The walls have edges that form the faces or edges of the honeycomb as shown at 14 and 16. The other two components are face sheets 17 and 19. The face sheets 17 and 19 include interior surfaces 21 and 23, respectively, for bonding to the honeycomb edges. The face sheets 17 and 19 also include exterior surfaces 25 and 27, respectively.

The face sheet can be made form a wide variety of materials including metals, plastics and composite materials. Exemplary metals include aluminum and stainless steel. Exemplary plastics include KYDEX® plastic, WILSONART® acrylic-based materials and high pressure laminates of melamine solid surface materials. Exemplary composite face sheets are composed of a fibrous reinforcement and a resin matrix. Exemplary fiber materials include glass, aramid, carbon, ceramic and hybrids thereof. The fibers may be woven, unidirectional or in the form of random fiber mat. Woven carbon fibers are preferred, such as plain, harness satin, twill and basket weave styles that have areal weights from 80-600 gsm, but more preferably from 190-300 gsm. The carbon fibers can have from 3,000-40,000 filaments per tow, but more preferably 3,000-12,000 filaments per tow. All of which are commercially available. Similar styles of glass fabric may also be used with the most common being 7781 at 303 gsm and 120 at 107 gsm. When unidirectional constructions are used, typical ply-weights are 150 gsm for carbon and 250 gsm for glass. Kevlar® para-aramid fibers are also suitable.

The resin matrix that impregnates the fibers in a composite material face sheet may be an epoxy resin, phenolic resin or other suitable resin that is conventionally used in composite face sheets. For high temperature operation and flame resistance, a metal face sheet or composite face sheet made up of glass or carbon fibers and an epoxy phenolic resin matrix are preferred. Other suitable composite face sheets include those that contain quartz fibers. Other resins include polyester resins, bismaleimide resins, polyimide resins, polyamideimide resins and polyetherimide resins. Face sheets that are a combination of an inner composite material layer and an outer metal layer are possible, especially when resistance to high temperatures and fire are a concern. Particularly preferred faces sheets are those composed of glass or carbon fibers combined with a phenolic resin matrix. These types of composite face sheets are preferred due to their high strength, light weight and thermal properties.

The face sheets 17 and 19 are typically bonded to the honeycomb edges 14 and 16, respectively, using a separate adhesive. Such adhesives include epoxies, acrylics, phenolics, cyanoacrylates, bismaleimides, polyamide-imides and polyimides. For high temperature operations, phenolic and bismaleimide adhesives are preferred. As is known, composite face sheets may be provided in an uncured state (prepreg) where the matrix resin has not been cured. The prepreg face sheet is cured only after it has been applied to the honeycomb edge with the matrix resin functioning as the bonding adhesive. This type of face sheet is commonly referred to as a "self-adhesive" face sheet.

Figure 2:
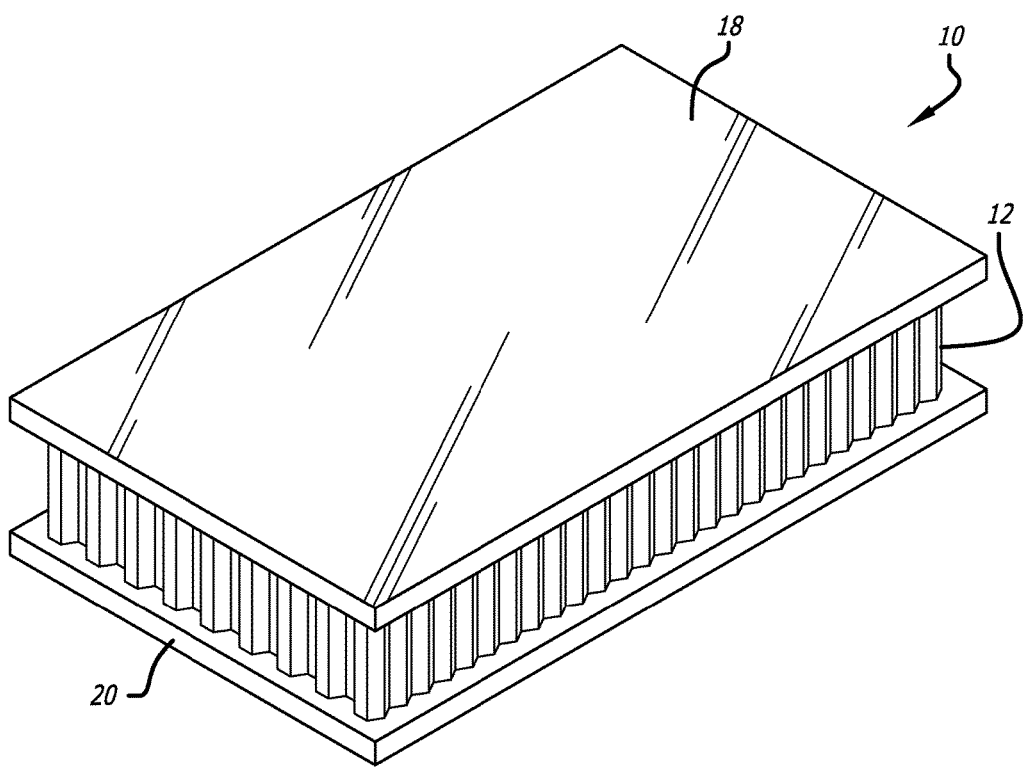
FIG. 2 is a perspective view of a preferred exemplary sandwich panel where the components shown in FIG. 1 have been bonded together and cured to form the final honeycomb sandwich panel.

The assembled structural panel 10 is shown in FIG. 2, with the face sheets 18 and 20 being bonded in place on either side of the honeycomb 12. It should be noted that the primary use for honeycomb made using the alternate resin-coated paper material is structural panels of the type shown in FIG. 2, where a honeycomb 12 is sandwiched between two face sheets 18 and 20. However, there may be situations where structural panels having a face sheet bonded to only one side of the honeycomb are useful. For example, in some situations it is desirable to bond the honeycomb directly to an underlying structure so that a structural panel having only one face sheet is required. Accordingly, the present invention is not limited to honeycomb that is sandwiched between two face sheets.

The dimensions of the honeycomb can be varied widely. For aircraft use, the honeycomb cores will typically have ⅛ to ½ inch (3.2-12.7 mm) wide cells with the cores being ⅛ inch (3.2 mm) to 2 inches (50.8 mm) thick (distance between the honeycomb edges). The thickness of the honeycomb walls may also be varied with typical honeycomb walls being on the order of 0.001 inch (0.25 mm) to 0.005 inch (0.13 mm) thick. The combination of cell size, wall thickness and density of the material that is used determines the weight of the core which is expressed in pounds per cubic foot (pcf). Honeycomb having weights on the order of 2 pcf to 12 pcf are preferred.

The alternate resin-coated paper material in accordance with the present invention can be made using any conventional paper making process provided that the resulting layer of paper is made up from 30 to 50 weight percent aramid fibers and from 50 to 70 weight percent of non-aramid fibers, based on the total weight of the paper. The aramid fibers that make up the aramide portion of the alternative paper may be a meta-aramid fiber of the type that is used in well-known meta-aramid fiber papers, such as NOMEX® aramid paper. However, para-aramid fiber of the type used in well-known para-aramid fiber papers, such as KEVLAR® aramid paper are preferred because they are stiffer than meta-aramid fibers and provide needed stiffness that may be missing due to the presence of non-aramid fibers. Meta-aramid fibers and para-aramid fibers may be combined together to form the aramid portion of the alternative aramid fiber-based paper. When a combination of meta-aramid and para-aramid fibers are used, it is preferred that no more than 10 weight percent of the combined aramid fiber weight be meta-aramid fibers and most preferred is less than 5 weight percent meta-aramid fibers.

The aramid fibers that make up the aramid portion of the alternative aramid fiber-based paper are a combination of short fibers and pulp which provides a suitable paper. The aramid portion contains 1 to 40 weight percent aramid pulp, based on the weight of the aramid portion, with the remainder being short aramid fibers. A preferred aramid portion is one that contains from 15 to 35 weight percent aramid pulp, based on the weight of the aramid portion.

Short aramid fibers have lengths of between 0.1 mm and 50 mm and single filament deniers of from 0.2 to 5. Preferred short aramid fibers will have lengths of between 1 mm and 20 mm with preferred single filament deniers being from 0.5 to 3. Aramid pulp is composed of short aramid fibers, which have lengths of between 1 mm and 6 mm that have been suspended in water or other suitable solution and fibrillated. The surface area of the aramid pulp, which is determined by the degree of fibrillation, is between 3 and 16 $m^2/g$. The diameters of the aramid fiber filaments range from 5 to 30 microns with diameters of 10 to 15 microns being preferred.

The fibers that make up the non-aramid portion of the alternative aramid fiber-based paper may be polyester fibers, acrylic fiber, polyethylene fiber, polypropylene fiber polyamide fiber, polyphenylene oxide (PPO), polyphenylene sulfide (PPS), polyamideimide fiber, polybenzimidazole (PBI) and cellulose fiber. These fibers are preferred as the non-aramid fiber component of the alternative aramid fiber-based paper because they are not as stiff as aramid fibers and therefor provide a degree of flexibility, formability and processability that is not possible with paper made exclusively of aramid fibers. The lower limit of 50 weight percent for non-aramid fibers is required in order to have sufficient non-aramid fibers present in the alternative aramid fiber-based paper to achieve desired improvement in flexibility and formability, and the 70 weight percent upper limit is required to ensure that the alternative aramid fiber-based paper, when coated to form the alternate resin-coated paper material, matches the burn properties of resin coated NOMEX® aramid paper when tested as set forth in Appendix F of 14 C.F.R. 25.853. The alternate resin-coated paper must have a self-extinguishing time of less than 10 seconds, preferably less than 5 seconds and more preferably from 0 to 2 seconds, when exposed to a 12-second vertical flame as set forth in Appendix F of 14 C.F.R. 25.853. The alternate resin-coated paper must also have a self-extinguishing burn length of less than 12 inches (30.5 cm), preferably less than 8 inches (20.3 cm) and more preferably less than 5 inches (12.7 cm), when exposed to a 12-second vertical flame as set forth in Appendix F of 14 C.F.R. 25.853.

The non-aramid fibers that make up the non-aramid portion of the alternative aramid fiber-based paper are a combination of short fibers and pulp which provides a suitable paper. The non-aramid portion contains 1 to 40 weight percent non-aramid pulp, based on the weight of the non-aramid portion, with the remainder being short non-aramid fibers. A preferred non-aramid portion is one that contains from 15 to 35 weight percent non-aramid pulp, based on the total weight of the non-aramid fiber portion.

Short non-aramid fibers have lengths of between 0.1 mm and 50 mm and single filament deniers of from 0.001 to 10. Preferred short non-aramid fibers will have lengths of between 1 mm and 25 mm with single filament preferred deniers being from 2 to 10. Non-aramid pulp is composed of short non-aramid fibers that have been suspended in water or other suitable solution and fibrillated. For example, cellulose fiber pulp that has a bulk of between 1 and 2 cm$^3$/g is commercially available.

In a preferred embodiment, the layer of alternative aramid fiber-based paper, prior to any resin coating, contains from 35 to 45 weight percent para-aramid fiber and from 55 to 65 weight percent non-aramid fibers which are preferably a combination of polyester fibers and acrylic fibers. Both the denier and length of the aramid and non-aramid fiber and pulp may be varied depending upon the desired size and weight of the layer of paper. The layer of alternative aramid fiber-based paper will typically have an areal weight of from 20 to 120 gsm and a thickness of from 0.0015 inch (0.04 mm) to 0.005 inch (0.13 mm).

The alternative aramid fiber-based paper is made using any of the paper making processes that have been used to make aramid-fiber containing paper. The processes typically involve mixing the desired combination of fiber and pulp in a suitable solution to form a slurry which preferably does not contain a polymeric binder. The processes used to form the slurry into a paper are well-know. Exemplary processes for making aramid-containing paper are set forth in: U.S. Pat. No. 4,729,921; U.S. Pat. No. 5,026,456; U.S. Pat. No. 8,764,941; U.S. Patent Publication 2009/0214848A1; U.S. Patent Publication 2011/0281063A1; and EP 1756360B1, the contents of which are hereby incorporated by reference.

The layer of alternative aramid fiber-based paper may be coated with a fire retarded phenolic resin either before or after formation of the paper into a honeycomb. It is preferred that the alternative aramid fiber-based paper be coated with the fire retarded phenolic resin after being formed into a honeycomb using a conventional honeycomb formation method. For example, lines of a suitable honeycomb adhesive are applied by printing or other suitable means to multiple layers of the alternative aramid fiber-based paper. The alternative aramid fiber-based paper is stacked and pressed to form a hobe in which the lines of adhesive between the layers are off-set. The hobe is then expanded to form the desired honeycomb and heat set, if necessary. The honeycomb is then dipped into a liquid containing the fire retarded phenolic resin to coat the honeycomb. The resulting coating of fire retarded phenolic resin is cured according to conventional curing methods. For example, the resin-coated honeycomb is cured at temperatures of from 140 to 200° C. for times ranging from 30 to 90 minutes. The dipping/curing step may be repeated one or more times depending upon the desired loading of fire retarded phenolic resin. This type of honeycomb formation method is commonly referred to as the "expansion method". When the expansion method is used, the alternate resin-coated paper material and the final honeycomb wall are formed at the same time. Accordingly, the alternate resin-coated paper material becomes the honeycomb wall during formation of the alternate resin-coated paper material.

If desired, the fire retarded phenolic resin may be applied by spraying or other coating method. Also, the honeycomb may be formed using the "corrugation" method. The corrugation method involves forming the layers of alternative aramid fiber-based paper into corrugated sheets that are bonded together to form the honeycomb. The corrugation method may be used in those situations where use of the preferred expansion method is not desired. When the corrugation method is used, the alternate resin-coated paper material may be formed prior to formation of the honeycomb. Accordingly, the alternate resin-coated paper material may exist separately from the honeycomb and becomes the honeycomb wall only after bonding of the corrugated layers together.

The alternative aramid fiber-based paper must be coated with a sufficient amount of a fire retarded phenolic resin that includes a sufficient amount of a phosphorous-containing fire retardant to ensure that the alternate resin-coated paper material has thermal properties that match resin-coated NOMEX® aramid paper, while at the same time not deleteriously affecting other honeycomb properties, such as bare compression strength, flat-wise tension strength, stabilized compression strength, stabilized compression modulus, plate shear strength and plate shear modulus. It was discovered that the fire retarded phenolic resin should be present as a coating that weighs from 40 to 65 weight percent of the total weight of the alternate resin-coated paper material or honeycomb wall in order to provide the desired combination of thermal properties, strength and light weight. A coating of fire retarded phenolic resin that makes up from 50 to 60 of the total weight of the alternate resin-coated paper material or honeycomb wall is preferred.

The fire retarded phenolic resin may include any of the phenol formaldehyde resins that are employed as a phenolic "dip resin" for coating aramid paper honeycomb. Other dip resins may be used provided that they can be treated with a sufficient amount of phosphorous-containing fire retardant so that the resulting alternate resin-coated paper matches the thermal property of resin-coated NOMEX® aramid paper, as measured in accordance with 14 C.F.R. Part 25.853. A preferred exemplary phenol formaldehyde resin is available from Durez Corporation (Niagara Falls, N.Y.) under the tradename 23056NF.

The fire retardant that is present in the fire retarded phenolic resin is a phosphorous-containing fire retardant, such as a phenoxyphosphazene or a phosphonate oligomer. Preferred fire retardants include OL3001, which is a phosphonate oligomer that is available from FRX Polymers (Chelmsford, Mass.). OL3001 is provided as coarse white granules that contain 10 weight percent phosphorous. The average molecular weight (Mn) of the phosphonate oligomer is 2,500. OL3001 has a glass transition temperature (Tg) of 85° C. Other suitable phosphonate oligomers are described in U.S. Pat. No. 4,331,614 and PCT Publication WO2009/012286, the contents of which are hereby incorporated by reference.

Another preferred phosphorous-containing fire retardant is SBP-100, which is a phenoxyphosphazene ($[N=P(OPh)_2]_3$) that is available from Otsuka Chemical Company (Osaka, Japan). SBP-100 is provided as a white to pale yellow powder of fine or coarse granules. SBP-100 has a phosphorous content of 13 weight percent and a melting point of 110° C. Other phosphazenes may be used as the fire retardant provided that they remain uniformly suspended in the phenolic resin and are able to provide the same level of fire retardation as SBP-100.

To be suitable for use in accordance with the present invention, the phosphorous-containing fire retardant must be mixable with the phenolic resin to form a stable suspension or solution. Fire retardants that settle out or otherwise do not remain uniformly suspended in the phenolic resin are not suitable. Both OL3001 and SBP-100 are particularly preferred because it was discovered that they could be mixed with phenolic resin to form a stable mixture in which the fire retardant was uniformly dispersed and did not settle out prior to application of the resin to the alternative aramid fiber-based paper.

The phosphorous-containing fire retardant is preferably dissolved in a suitable solvent, such as acetone, to form a solution that contains from 30 to 40 percent by weight fire retardant. An amount of the fire retardant solution is then added to the phenolic resin and mixed in thoroughly. The acetone is allowed to evaporate from the resin to produce the final dip resin for application to the alternative aramid fiber-based paper. The amount of fire retardant solution that is added to the phenolic resin is sufficient to provide a dip resin having from 2 to 6 weight percent phosphorous, based on the weight of the dip resin. The amount of fire retardant solution needed to achieve desired phosphorous levels in the dip resin is calculated based on the known phosphorous content of the fire retardant, the amount of fire retardant in the solution and the amount of solution added to the phenoxy resin.

It was discovered that at least 2 weight percent phosphorus in the dip resin is needed in order to make the alternate resin-coated paper material self-extinguishing in 10 seconds or less with a burn length of 12 inches (30.5 cm) or less when exposed to a 12-second vertical flame as set forth in Appendix F of 14 C.F.R. 25.853. Amounts of phosphorous of over 6 weight percent in the dip resin do not provide any additional improvement in self-extinguishment and may begin to have a deleterious effect on other desirable properties of the alternate resin-coated paper material. It was further discovered that 4 weight percent phosphorous in the dip resin provides a reduction in self-extinguishing burn lengths with respect to dip resins containing 2 weight percent phosphorous. Accordingly, it is preferred that the dip resin contain a sufficient amount of phosphorous-containing fire retardant so that the amount of phosphorous in the dip resin is about 4 weight percent.

Examples of practice are as follows:

Example 1

A first exemplary alternative aramid-based paper is available from 3M Electrical Markets Division (Tilton, N.H.) under the tradename 83A. This first exemplary paper is made according to standard paper making procedures where a slurry containing the desired combination of fibers and pulp is processed to form a sheet of paper. The slurry used to make this alternative aramid-based paper contains a combination of short para-aramid fibers, para-aramid pulp, short thermoplastic fibers and cellulose pulp. The slurry is processed to form an alternative aramid-based paper containing approximately less than half by weight para-aramide short fibers and para-aramid pulp and approximately greater than half by weight short thermoplastic fibers and cellulose pulp. Samples of various alternate resin-coated paper materials were formed by dip-coating 83A alternative aramid-based paper with fire retarded resins that contained differing amounts of phosphorous. The resin used to make the fire retarded resin was Durez 23056NF phenolic resin. SBP-100 and OL3001 phosphorous-containing fire retardants were dissolved in acetone in amounts sufficient to form fire retardant solutions containing various amounts of the fire retardant ranging from 15 to 40 weight percent of the total weight of the solution. Fire retardant solutions containing the various weight percentages of the fire retardant were incorporated into the phenolic resin to provide dip resins that contained either 0, 2 or 4 weight percent phosphorous. The alternative aramid-based paper was coated with the various dip resins and cured to provide the samples for testing for self-extinguishment in accordance with the 12-second vertical flame test procedures set forth in Appendix F of 14 C.F.R. Part 25.853. All of the tested samples had a resin content of 55 weight percent based on the total weight of the alternate resin-coated paper material.

The test sample containing 0 phosphorous had a self-extinguishing time of at least 60 seconds and the vertical burn length was at least 12 inches (30.5 cm). The 2 weight percent phosphorous samples using either SBP-100 or OL3001 as the fire retardant exhibited self-extinguishing times of 0 seconds. The burn length for the SBP-100 sample was 8.0 inches (20.3 cm) with the burn length for the OL3001 sample being slightly longer at 8.3 inches (21.1 cm). The 4 weight percent phosphorous samples using either SBP-100 or OL3001 as the fire retardant exhibited self-extinguishing times of 0 seconds. The burn length for the SBP-100 sample was 5.9 inches (15.0 cm) with the burn length for the OL3001 sample being slightly shorter at 4.4 inches (11.2 cm).

The first exemplary alternative aramid-based paper was tested in accordance with the 12-second vertical flame test procedures set forth in Appendix F of 14 C.F.R. Part 25.853 prior to coating with a phenolic resin. The bare first exemplary alternative aramid-base paper had a self-extinguish time of at least 60 seconds and a vertical burn length of at least 12 inches (30.5 cm).

Example 2

A second exemplary alternative aramid-based paper was made according to standard paper making procedures where a slurry containing the desired combination of fibers and pulp is processed to form a sheet of paper. The slurry used to make the alternative aramid-based paper contained a proprietary combination of para-aramid fibers, para-aramid pulp, non-aramid fibers and non-aramid pulp. The slurry was processed to form an alternative aramid-based paper containing approximately 40 weight percent para-aramid fiber and pulp and approximately 60 weight percent non-aramid fibers and pulp. Samples of various alternate resin-coated paper materials were formed by dip-coating the alternative aramid-based paper with fire retarded resins that contained differing amounts of phosphorous. The resin used to make the fire retarded resin was Durez 23056NF phenolic resin. SBP-100 and OL3001 phosphorous-containing fire retardants were dissolved in acetone in amounts sufficient to form fire retardant solutions containing various amounts of the fire retardant ranging from 15 to 40 weight percent of the total weight of the solution. Fire retardant solutions containing the various weight percentages of the fire retardant were incorporated into the phenolic resin to provide dip resins that contained either 0, 2 or 4 weight percent phosphorous. The alternative aramid-based paper was coated with the various dip resins and cured to provide the samples for testing for self-extinguishment in accordance with the 12-second vertical flame test procedures set forth in Appendix F of 14 C.F.R. Part 25.853. All of the tested samples had a resin content of 55 weight percent based on the total weight of the alternate resin-coated paper material.

The test sample containing 0 phosphorous had a self-extinguishing time of at least 60 seconds and the vertical burn length being at least 12 inches (30.5 cm). The 2 weight percent phosphorous samples using either SBP-100 or OL3001 as the fire retardant exhibited self-extinguishing times of 0-1 seconds. The burn length for the SBP-100 sample was 4.7 inches (11.9 cm) with the burn length for the OL3001 sample being slightly longer at 7.5 inches (19.0 cm). The 4 weight percent phosphorous samples using either SBP-100 or OL3001 as the fire retardant exhibited self-extinguishing times of 0 seconds. The burn length for the SBP-100 sample was 4.4 inches (11.2 cm) with the burn length for the OL3001 samples being slightly shorter at 4.0 inches (10.2 cm).

The second exemplary alternative aramid-based paper was tested in accordance with the 12-second vertical flame test procedures set forth in Appendix F of 14 C.F.R. Part 25.853 prior to coating with a phenolic resin. The bare second exemplary alternative aramid-base paper had a self-extinguish time of at least 60 seconds and a vertical burn length of at least 12 inches (30.5 cm).

Samples for testing in accordance with the 12-second vertical flame test procedures set forth in Appendix F of 14 C.F.R. Part 25.853 were also prepared using standard NOMEX® aramid paper. The NOMEX® aramid paper was coated with Durez 23056NF phenolic resin containing SBP-100 or OL3001 flame retardant in the same manner as Examples 1 and 2 to form test samples containing 0, 2 and 4 weight percent phosphorous.

The phenolic-coated NOMEX® test sample containing 0 phosphorous had a self-extinguishing time of 2 seconds and the vertical burn length was 2.8 inches (7.1 cm). The 2 weight percent phosphorous phenolic-coated NOMEX® test samples, using either SBP-100 or OL3001 as the fire retardant, exhibited self-extinguishing times of 0 seconds. The burn length for the SBP-100 sample was 2.0 inches (5.1 cm) with the burn length for the OL3001 sample being slightly shorter at 1.5 inches (3.8 cm). The 4 weight percent phosphorous phenolic-coated NOMEX® test samples, using either SBP-100 or OL3001 as the fire retardant, exhibited self-extinguishing times of 0 seconds. The burn lengths for the SBP-100 sample was 1.4 inches (3.6 cm) with the burn length for the OL3001 sample being slightly longer at 1.5 inches (3.8 cm).

The standard NOMEX® aramid paper was tested in accordance with the 12-second vertical flame test procedures set forth in Appendix F of 14 C.F.R. Part 25.853 prior to coating with a phenolic resin. The bare NOMEX® aramid paper had a self-extinguish time of 0 seconds and a vertical burn length of 8.3 inches (21.1 cm).

As can be seen from the above examples, the use of phosphorous-containing flame retardants in the phenolic resin coating to provide phosphorous levels of between 2 to 6 weight percent, results in only minor improvement in the self-extinguishing properties of standard NOMEX® aramid paper. In contrast, it was discovered that the incorporation of such levels of phosphorous into the phenolic coating provides a significant improvement in the self-extinguishing properties of the alternative aramid-based paper in accordance with the present invention. The present invention provides an alternate resin-coated paper materials which has self-extinguishing properties that match resin-coated NOMEX® aramid paper. As a result, the alternate resin-coated paper material can be used as a "drop-in" replacement for the conventional phenolic-coated aramid paper that is used in making honeycomb.

Example 3

The first exemplary alternative aramid-based paper described in Example 1 was made into honeycomb blocks by printing adhesive lines on layers of the first exemplary alternative aramid-based paper and forming a stack in accordance with the known expansion process. The stack was then pressed to form a hobe that was expanded and heat set to form honeycomb blocks with cell sizes of ⅛ inch (3 mm). The honeycomb blocks were dipped one or more times in the same fire-retarded resins described in Example 1 and cured to form honeycomb having walls coated with phenolic resin that contained 0, 2 or 4 weight percent phosphorous. The cured honeycomb was cut to provide 0.50 inch (1.3 cm) thick slices of honeycomb as samples for testing for self-extinguishment when exposed to vertical flame for 60 seconds, OSU Peak Heat Release and OSU 2 Minute Heat Release in accordance with the test procedures set forth in Appendix F of 14 C.F.R. Part 25.853. All of the tested samples had a resin content of 55 weight percent based on the total weight of the honeycomb.

All of the honeycomb samples tested for self-extinguishment and vertical burn (60 second vertical flame exposure) had self-extinguish times of 1 second or less and vertical burn lengths of 5 inches (12.7 cm) or less regardless of the amount of phosphorous in the resin coating.

For the honeycomb samples coated with 0 weight percent phosphorous resin, the OSU Peak Heat Release was 70 kW/m$^2$ and the OSU 2 Minute Heat Release was 80 kW-minute/m$^2$. For the honeycomb samples coated with 2 weight percent phosphorous resin, the OSU Peak Heat Release dropped to 59 kW/m$^2$ for the samples containing SBP-100 fire retardant and 56 kW/m$^2$ for the samples containing OL3001 fire retardant. The OSU 2 Minute Heat Release dropped to 73 kW-minute/m$^2$ for the samples containing SBP-100 fire retardant and 67 kW-minute/m$^2$ for the samples containing OL3001 fire retardant.

For the honeycomb samples coated with 4 weight percent phosphorous resin, the OSU Peak Heat Release dropped to 58 kW/m$^2$ for the samples containing either the SBP-100 fire retardant or OL3001 fire retardant. The OSU 2 Minute Heat Release dropped to 67 kW-minute/m$^2$ for the samples containing SBP-100 fire retardant and 66 kW-minute/m$^2$ for the samples containing OL3001 fire retardant.

Example 4

The second exemplary alternative aramid-based paper described in Example 2 was made into resin-coated honeycomb samples in the same manner as Example 3 and tested for self-extinguishment and heat release in the same manner as Example 3. All of the honeycomb samples tested for self-extinguishment and vertical burn had self-extinguish times of 0 second and vertical burn lengths of 3 inches (7.6 cm) or less regardless of the amount of phosphorous in the resin coating.

For the honeycomb samples coated with 0 weight percent phosphorous resin, the OSU Peak Heat Release was 85 kW/m$^2$ and the OSU 2 Minute Heat Release was 88 kW-minute/m$^2$. For the honeycomb samples coated with 2 weight percent phosphorous resin, the OSU Peak Heat Release dropped to 60 kW/m$^2$ for the samples containing SBP-100 fire retardant or OL3001 fire retardant. The OSU 2 Minute Heat Release dropped to 68 kW-minute/m$^2$ for the samples containing SBP-100 fire retardant and 56 kW-minute/m$^2$ for the samples containing OL3001 fire retardant.

For the honeycomb sample coated with 4 weight percent phosphorous resin, the OSU Peak Heat Release dropped to 75 kW/m$^2$ for the samples containing the SBP-100 fire retardant and 59 kW/m$^2$ for samples containing the OL3001 fire retardant. The OSU 2 Minute Heat Release dropped to 70 kW-minute/m$^2$ for the samples containing SBP-100 fire retardant and 59 kW-minute/m$^2$ for the samples containing OL3001 fire retardant.

The NOMEX® aramid paper that was coated with Durez 23056NF phenolic resin containing SBP-100 or OL3001 flame retardant in the same manner as Examples 1 and 2 was also used to make resin-coated honeycomb samples in the same manner as Example 3 and tested for self-extinguishment and heat release in the same manner as Example 3. All of the resin coated NOMEX® aramid paper honeycomb samples tested for self-extinguishment and vertical burn had self-extinguish times of 0 second and vertical burn lengths of 2 inches (5.1 cm) or less regardless of the amount of phosphorous in the resin coating.

For the NOMEX® aramid paper honeycomb samples coated with 0 weight percent phosphorous resin, the OSU Peak Heat Release was 57 kW/m$^2$ and the OSU 2 Minute Heat Release was 68 kW-minute/m$^2$. For the honeycomb samples coated with 2 weight percent phosphorous resin, the OSU Peak Heat Release was 46 kW/m$^2$ for the samples containing SBP-100 fire retardant and 43 kW/m$^2$ for samples containing OL3001 fire retardant. The OSU 2 Minute Heat Release was 61 kW-minute/m$^2$ for the samples containing SBP-100 fire retardant and 50 kW-minute/m$^2$ for the samples containing OL3001 fire retardant.

For the NOMEX® aramid paper honeycomb sample coated with 4 weight percent phosphorous resin, the OSU Peak Heat Release was 54 kW/m$^2$ for the samples containing the SBP-100 fire retardant and 41 kW/m$^2$ for samples containing the OL3001 fire retardant. The OSU 2 Minute Heat Release was 60 kW-minute/m$^2$ for the samples containing SBP-100 fire retardant and 53 kW-minute/m$^2$ for the samples containing OL3001 fire retardant.

As can be seen from the above examples, all of the resin coated honeycomb have low self-extinguishing times and burn lengths regardless of the amount, if any, of fire retardant in the resin coating. However, the peak heat release and 2-minute heat release properties of honeycomb made using the alternate resin-coated paper materials do depend on and require the presence of a phosphorous-containing fire retardant. As shown in the examples, from 2 to 4 weight percent of the fire retardant in the resin coating provides an alternate material honeycomb having peak heat release and 2-minute heat release properties that are reduced to levels that are similar to NOMEX® aramid paper honeycomb which has been coated with phenolic resin that does not contain a flame retardant. In addition, the alternate material honeycombs have peak heat release and 2-minute heat release properties that are only slightly above the corresponding heat release properties for NOMEX® aramid paper honeycomb which has been coated with phenolic resin that does contain a flame retardant. This further confirms that the alternate resin-coated paper material can be used as a "drop-in" replacement for the conventional phenolic-coated aramid paper that is used in making honeycomb.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A honeycomb for use in making aircraft panels wherein said honeycomb has walls comprising a resin-coated paper material that has a self-extinguishing time of less than 10 seconds and a self-extinguishing burn length of less than 12 inches when exposed to a 12 second vertical flame in accordance with the vertical burn test requirements set forth in 14 C.F.R. Part 25.583, said resin-coated paper material comprising:
   a. layer of paper comprising from 30 to 50 weight percent para-aramid fibers and para-aramid pulp, based on the total weight of said paper, and from 50 to 70 weight percent non-aramid fibers and non-aramid pulp, based on the total weight of said paper, said non-aramid fibers being selected from the group consisting of polyester fibers and acrylic fibers and said non-aramid pulp comprising, cellulose fibers; and
   a fire retarded phenolic resin comprising a phenol formaldehyde resin and a sufficient amount of a phosphorous-containing fire retardant so that said fire retarded phenolic resin contains from 2 to 6 weight percent phosphorous, wherein the amount of said fire retarded phenolic resin in said resin-coated paper material is sufficient to so that said resin-coated paper material has a self-extinguishing time of less than 10 seconds and a self-extinguishing burn length of less than 12 inches when exposed to a 12-second vertical flame in accordance with the vertical burn test requirements set forth in 14 C.F.R. Part 25.583.

2. The honeycomb for use in making aircraft panels according to claim 1 wherein said resin-coated paper material comprises from 40 to 65 weight percent of said fire retarded phenolic resin, based on the total weight of said honeycomb walls.

3. The honeycomb for use in making aircraft panels according to claim 1 wherein said phosphorous-containing fire retardant is a phenoxyphosphazene.

4. The honeycomb for use in making aircraft panels according to claim 1 wherein said phosphorous-containing fire retardant is a phosphonate oligomer.

5. A panel that comprises the honeycomb, according to claim 1 and a face sheet that is bonded to said honeycomb.

6. The honeycomb for use in making aircraft panels according to claim 1 wherein the amount of para-aramid pulp in said paper is from 15 to 35 weight percent, based on the total weight of the para-aramid fibers and para-aramid pulp.

7. The honeycomb for use in making aircraft panels according to claim 6 wherein the amount of non-aramid pulp in said paper is from 15 to 35 weight percent, based on the total weight of the non-aramid fibers and non-aramid pulp.

8. The honeycomb for use in making aircraft panels according to claim 1 wherein the amount of non-aramid pulp in said paper is from 15 to 35 weight percent, based on the total weight of the non-aramid fibers and non-aramid pulp.

* * * * *